US008032081B2

United States Patent
Bai et al.

(10) Patent No.: US 8,032,081 B2
(45) Date of Patent: Oct. 4, 2011

(54) USING V2X IN-NETWORK SESSION MAINTENANCE PROTOCOLS TO ENABLE INSTANT CHATTING APPLICATIONS

(75) Inventors: Fan Bai, Ann Arbor, MI (US); Donald K. Grimm, Utica, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 374 days.

(21) Appl. No.: 12/415,804

(22) Filed: Mar. 31, 2009

(65) Prior Publication Data

US 2010/0248618 A1 Sep. 30, 2010

(51) Int. Cl.
*H04B 7/15* (2006.01)
(52) U.S. Cl. .......................... 455/11.1; 455/569.2; 701/1
(58) Field of Classification Search .................. 455/11.1, 455/569.2; 701/1
See application file for complete search history.

(56) References Cited

U.S. PATENT DOCUMENTS

| | | | | |
|---|---|---|---|---|
| 6,249,232 B1 * | 6/2001 | Tamura et al. | ................ | 340/902 |
| 6,615,137 B2 * | 9/2003 | Lutter et al. | ................ | 701/301 |
| 7,804,423 B2 * | 9/2010 | Mudalige et al. | ............ | 340/902 |
| 2007/0252723 A1 * | 11/2007 | Boss et al. | ................ | 340/902 |
| 2008/0065311 A1 * | 3/2008 | Bauchot et al. | ............... | 701/117 |
| 2009/0045977 A1 * | 2/2009 | Bai et al. | ........................ | 340/905 |
| 2009/0271112 A1 * | 10/2009 | Basnayake | .................... | 701/213 |
| 2009/0309757 A1 * | 12/2009 | Mudalige et al. | ............. | 340/905 |
| 2009/0310608 A1 * | 12/2009 | Chen et al. | .................... | 370/389 |
| 2010/0245124 A1 * | 9/2010 | Bai et al. | ...................... | 340/905 |
| 2010/0250106 A1 * | 9/2010 | Bai et al. | ...................... | 701/117 |
| 2010/0250346 A1 * | 9/2010 | Bai et al. | ...................... | 705/14.1 |
| 2011/0035150 A1 * | 2/2011 | Sundarraj et al. | ............ | 701/301 |
| 2011/0083011 A1 * | 4/2011 | Dicrescenzo | ................. | 713/158 |
| 2011/0097401 A1 * | 4/2011 | Phillips et al. | ................ | 424/479 |

* cited by examiner

*Primary Examiner* — Lincoln Donovan
*Assistant Examiner* — Adam Houston
(74) *Attorney, Agent, or Firm* — John A. Miller; Miller IP Group, PLC

(57) ABSTRACT

A system and method for allowing vehicle occupants to wirelessly chat with each other over a DSRC channel. A vehicle occupant may initiate a chatting session by wirelessly transmitting a request to speak with an occupant of another vehicle in its vicinity on a certain topic in a multi-hop manner. If the request is accepted by the occupant of another vehicle to enter into a chatting session on that topic, a wireless communications link is established between the two vehicles, where messages may be transmitted through other intermediate vehicles. The chatting session is maintained by monitoring the signal strength of the links between the vehicles in the chain of vehicles and new links are re-established if any of the existing links fail.

20 Claims, 2 Drawing Sheets

USING V2X IN-NETWORK SESSION MAINTENANCE PROTOCOLS TO ENABLE INSTANT CHATTING APPLICATIONS

BACKGROUND OF THE INVENTION

1. Field of the Invention

This invention relates generally to a system and method for allowing vehicle occupants to chat with each other over a wireless communications link and, more particularly, to a system and method for allowing vehicle occupants to chat with each other over a wireless dedicated short range communications (DSRC) channel, where messages may be transmitted from vehicle to vehicle between chatting partners and where initiation of the chatting session may be provided by sending out a request for a discussion on a certain topic.

2. Discussion of the Related Art

Traffic accidents and roadway congestion are significant problems for vehicle travel. Vehicular ad-hoc network (VA-NET) based active safety and driver assistance systems are known that allow a vehicle communications system to transmit messages to other vehicles in a particular area with warning messages about dangerous road conditions, driving events, accidents, etc. In these systems, multi-hop geocast routing protocols, known to those skilled in the art, are commonly used to extend the reachability of the warning messages, i.e., to deliver active messages to vehicles that may be a few kilometers away from the road condition or may not be able to hear message broadcasts due to an obstruction, as a one-time multi-hop transmission process. In other words, an initial message advising drivers of a potential hazardous road condition is transferred from vehicle to vehicle using the geocast routing protocol so that vehicles a significant distance away will receive the messages because one vehicle's transmission distance is typically relatively short or may be obstructed by some physical object.

Vehicular ad-hoc network based active safety and driver assistance systems allow a wireless vehicle communications system, such as a dedicated short range communication (DSRC) system, known to those skilled in the art, to transmit messages to other vehicles in a particular area with warning messages about driving conditions. In these systems, multi-hop geocast routing protocols, known to those skilled in the art, are commonly used to extend the reachability of the warning messages, i.e., to deliver active messages to vehicles that may be a few kilometers away, as a one-time multi-hop transmission process. In other words, an initial message advising drivers of a certain situation is transferred from vehicle to vehicle using the geocast routing protocol so that relevant vehicles a significant distance away will receive the messages where one vehicle's direct transmission distance (range) is typically relatively short.

Vehicle-to-vehicle (V2V) and vehicle-to-infrastructure (V2X) applications require a minimum of one entity to send information to another entity. For example, many vehicle-to-vehicle safety applications can be executed on one vehicle by simply receiving broadcast messages from a neighboring vehicle. These messages are not directed to any specific vehicle, but are meant to be shared with a vehicle population to support the safety application. In these types of applications where collision avoidance is desirable, as two or more vehicles talk to each other and a collision becomes probable, the vehicle systems can warn the vehicle drivers, or possibly take evasive action for the driver, such as applying the brakes. Likewise, traffic control units can observe the broadcast of information and generate statistics on traffic flow through a given intersection or roadway.

The vehicle ad-hoc network communication systems discussed above have almost exclusively been used for safety applications. However, those systems can be extended to other applications, including non-safety applications.

SUMMARY OF THE INVENTION

In accordance with the teachings of the present invention, a system and method are disclosed for allowing vehicle occupants to wirelessly chat with each other over a DSRC channel. A vehicle occupant may initiate a chatting session by wirelessly transmitting a request to speak with an occupant of another vehicle in its vicinity on a certain topic. If the request is accepted by the occupant of another vehicle to enter into a chatting session on that topic, a wireless communications link is established between the two vehicles, where messages may be transmitted through other vehicles in a multi-hop routing manner. The chatting session is maintained by monitoring the signal strength of the individual links between the vehicles in the chain of vehicles and new links are re-established if any of the existing links along the established route fail.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for establishing and maintaining a wireless chatting link between vehicles using a DSRC system is merely exemplary in nature, and is in no way intended to limit the invention or its applications or uses.

As will be discussed in detail below, the present invention proposes a communications system and suitable protocols for using DSRC technology for establishing a chatting session between occupants of different vehicles that are in close proximity to each other traveling along a roadway, typically within 1 km, in a multi-hop manner. Typically, the chatting session will be limited to passengers in the vehicle because of the safety applications for drivers using the chatting application of the invention. Typically, the chatting session will be limited in its lifetime, such as 5-10 minutes.

Figure 1:
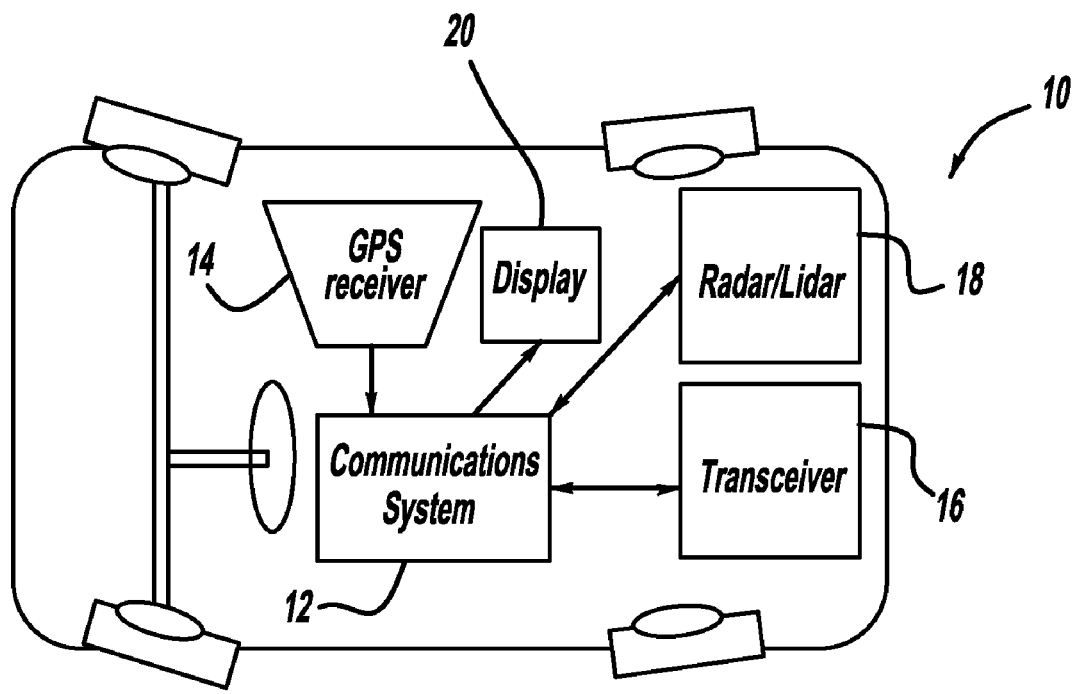
FIG. 1 is a plan view of a vehicle including a wireless communications system.

FIG. 1 is a representation of a vehicle 10 that includes a communications system 12, a GPS receiver 14, a transceiver 16, a lidar, radar, vision and/or other sensing devices 18 and a display 20 that may be used in a vehicular ad-hoc communications network for chatting purposes, as discussed herein. The communications system 12 can be any suitable wireless vehicle communication system for the purposes discussed herein, such as the known DSRC system.

Figure 2:
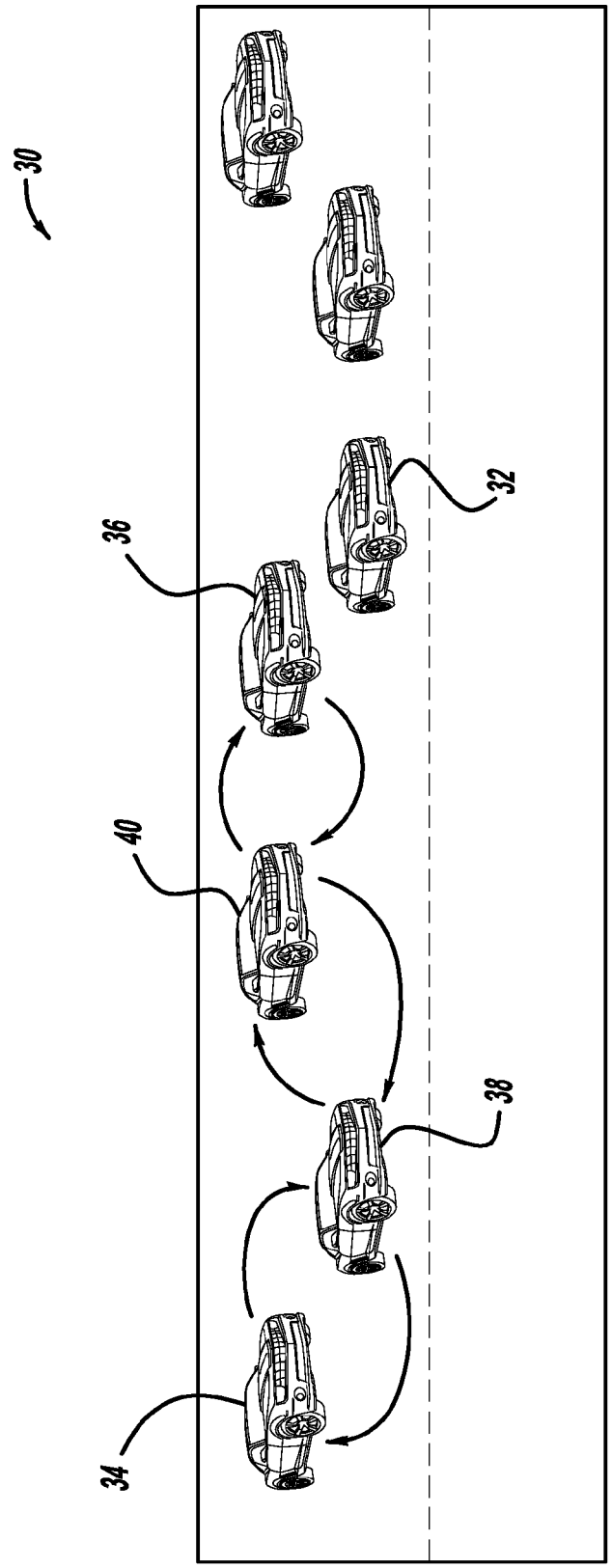
FIG. 2 is an illustration of a roadway on which vehicles are traveling where a chatting link is established between vehicles that wish to speak with each other.

FIG. 2 is an illustration of a roadway 30 on which is traveling a plurality of vehicles 32 in close proximity to each other. Each of the vehicles 32 is equipped with wireless DSRC technology and is able to wirelessly communicate with the other vehicles 32 by sending messages in a manner that is well understood to those skilled in the art. For the chatting application discussed herein, vehicle occupants that may want to send requests or receive requests for chatting sessions can turn on that feature in their vehicle so that communication links between the vehicle 32 can be established and can be displayed or otherwise made aware to the vehicle occupant.

A vehicle occupant in a chatting initiator vehicle 34 may wish to initiate a chatting session on a particular topic, such as sports, movies, recreation, etc. The chatting initiator vehicle 34 may send a message from its DSRC system 12 by either directly speaking once the system 12 is activated or by typing in a message request that is broadcast from the initiator vehicle 34 to be received by the other vehicles 32 within a certain range. The message can identify the topic desired to be discussed, the vehicle's identification, the vehicles location, message duration, etc. The message will be transmitted wirelessly from vehicle to vehicle in a multi-hop routing manner, and may reach a chatting partner vehicle 36 who is interested in chatting about that particular topic. The other vehicles 32 that may receive the message from the initiator vehicle 34 requesting a chatting session may not have the service turned on or may choose to not want to talk about that particular topic or be part of a chatting session for some other reason, and will just disregard the chatting request message, but will pass it on to other vehicles in the area. If the chatting initiator vehicle 34 receives more than one favorable reply to its request to chat, the chatting initiator vehicle 34 chooses only one of those messages as the chatting partner vehicle 36.

The chatting partner vehicle 36 will send the message back to the chatting initiator vehicle 34 to establish a chatting session, where the message link may possibly pass through intermediate node vehicles 38 and 40. When the chatting initiator vehicle 34 receives a message back from the chatting partner vehicle 36 that he is interested in the chatting session, the chatting initiator vehicle 34 then sends out a path establishment message to establish a routing path between the chatting initiator vehicle 34 and the chatting partner vehicle 36.

Once the chatting session is established, there is a message link between the initiator vehicle 34, the intermediate node vehicles 38 and 40 and the chatting partner vehicle 36. The occupants of the intermediate node vehicles 38 and 40 will not be aware that they are passing messages back and forth between the initiator vehicle 34 and the chatting partner vehicle 36 because that process will be happening through that vehicle's DSRC system below the user level. The other vehicles 32 may be receiving the messages, but will be ignoring them because they were not interested in the chatting session.

The format in which the actual chatting is accomplished can be any format suitable for the system being discussed. For example, the messages transmitted between the vehicles 32 can be digitally encoded voice messages where what is heard by the vehicle occupants is the actual voice of the other person in the other vehicle. Alternatively, the vehicles 32 can be equipped with synthesizers where the particular signals are synthesized and what is heard by vehicle occupants is synthesized speech. Further, the chatting session can be displayed as text on a screen.

Once the chatting session is established, the session needs to be maintained. Because the vehicles 32 are moving, the chance that the message link between the chatting initiator vehicle 34 and the chatting partner vehicle 36 will be broken is relatively high because the speeds of the vehicles relative to each other may different, a vehicle may exit a highway, etc. The chatting initiator vehicle 34 and all of the intermediate node vehicles 38 and 40 along the message routing path actively monitor the status of their own downstream link. Particularly, the chatting initiator vehicle 34 monitors the link to the first intermediate node vehicle 38, the first intermediate node vehicle 38 monitors the link to the second intermediate node vehicle 40 and the second intermediate node vehicle 40 monitors the link to the chatting partner vehicle 36.

The link is monitored by detecting the signal strength (RSSI) value of the received packets in the messages and the residual link duration. If the RSSI value is too low, such as less than −90 dBm, or the residual link duration is too short, such as less than 1 minute, the upstream node of the link issues a path break error message to the chatting initiator vehicle 34 reporting that the message path will fail. When the chatting initiator vehicle 34 receives the error message, it reinitiates a new request to chat message to find another routing path between the chatting initiator vehicle 34 and the chatting partner vehicle 36. Once the chatting initiator vehicle 34 finds the new routing path, it will replace the old routing path with the new routing path and resume the interactive chatting session. The transition from the old routing path to the new routing path is seamless.

When either the chatting initiator vehicle 34 or the chatting partner vehicle 36 wishes to end the chatting session, it will send a session finished message to the other and all of the intermediate node vehicles 38 and 40 along the routing path to terminate the chatting path.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing a wireless chatting session between vehicle occupants of vehicles, said method comprising:
   wirelessly transmitting a chatting request message from a chatting initiator vehicle;
   receiving the chatting request message at a plurality of other vehicles;
   accepting the chatting request message by a chatting partner vehicle by sending an accept chatting message back to the chatting initiator vehicle; and
   establishing a chatting path between the chatting initiator vehicle and the chatting partner vehicle through an intermediate vehicle where the intermediate vehicle transfers chatting messages as a relay vehicle between the chatting initiator vehicle and the chatting partner vehicle to allow occupants of the vehicles to speak to each other.

2. The method according to claim 1 further comprising monitoring a communications link between the chatting initiator vehicle, the intermediate vehicle and the chatting partner vehicle to determine whether the chatting path will be maintained.

3. The method according to claim 2 wherein monitoring the communications link includes monitoring the signal strength of message packets sent between the vehicles.

4. The method according to claim 3 wherein monitoring the communications link includes determining that the communications link will be broken if the signal strength of message packets falls below −90 dBm.

5. The method according to claim 2 wherein monitoring the communications link includes monitoring the residual link duration of the messages to determine if it is less than a predetermined time period.

6. The method according to claim 5 wherein monitoring the communications link includes determining that the communications link will be broken if the residual link derivation falls below 1 minute.

7. The method according to claim 2 further comprising re-establishing the communications link if a communications link is broken.

8. The method according to claim 1 further comprising ending the chatting session by either the chatting initiator vehicle or the chatting partner vehicle by sending a message ending the chatting session to destroy the chatting path.

9. The method according to claim 1 wherein transferring the chatting messages through an intermediate vehicle includes transmitting the chatting message through a plurality of intermediate vehicles.

10. The method according to claim 1 wherein transmitting a chatting request message includes transmitting a chatting request message on a specific topic.

11. A method for providing a wireless chatting session between vehicle occupants of vehicles, said method comprising:
   wirelessly transmitting a chatting request message from a chatting initiator vehicle on a specific topic;
   receiving the chatting request message at a plurality of other vehicles;
   accepting the chatting request message by a chatting partner vehicle by sending an accept chatting message back to the chatting initiator vehicle;
   establishing a chatting path between the chatting initiator vehicle and the chatting partner vehicle through a plurality of intermediate vehicles where the plurality of intermediate vehicles transfer chatting messages between the chatting initiator vehicle and the chatting partner vehicle to allow occupants of the vehicles to speak to each other;
   monitoring a communications link between the chatting initiator vehicle, the intermediate vehicles and the chatting partner vehicle to determine whether the chatting path will be maintained;
   re-establishing the communications link if a communications link is broken; and
   ending the chatting session by either the chatting initiator vehicle or the chatting partner vehicle by sending a message ending the chatting session to destroy the chatting path.

12. The method according to claim 2 wherein monitoring the communications link includes monitoring the signal strength of message packets sent between the vehicles.

13. The method according to claim 2 wherein monitoring the communications link includes monitoring the residual link duration of the messages to determine if it is less than a predetermined time period.

14. A system for providing a wireless chatting session between vehicle occupants of vehicles; said system comprising:
   means for wirelessly transmitting a chatting request message from a chatting initiator vehicle;
   means for receiving the chatting request message at a plurality of other vehicles;
   means for accepting the chatting request message by a chatting partner vehicle by sending an accept chatting message back to the chatting initiator vehicle; and
   means for establishing a chatting path between the chatting initiator vehicle and the chatting partner vehicle through an intermediate vehicle where the intermediate vehicle transfers chatting messages between the chatting initiator vehicle and the chatting partner vehicle to allow occupants of the vehicles to speak to each other.

15. The system according to claim 14 further comprising means for monitoring a communications link between the chatting initiator vehicle, the intermediate vehicle and the chatting partner vehicle to determine whether the chatting path will be maintained.

16. The system according to claim 15 wherein the means for monitoring the communications link monitors the signal strength of message packets sent between the vehicles.

17. The system according to claim 15 wherein the means for monitoring the communications link monitors the residual link duration of the messages to determine if it is less than a predetermined time period.

18. The system according to claim 14 further comprising means for re-establishing the communications link if a communications link is broken.

19. The system according to claim 14 further comprising means for ending the chatting session by either the chatting initiator vehicle or the chatting partner vehicle by sending a message ending the chatting session to destroy the chatting path.

20. The system according to claim 14 wherein the means for establishing a chatting path transfers the chatting messages through a plurality of intermediate vehicles.

* * * * *